United States Patent
Biggs

[15] 3,652,917
[45] Mar. 28, 1972

[54] BATTERY CHARGING SYSTEM USING A COULOMETER AS A LOGIC DEVICE

[72] Inventor: Carl E. Biggs, Niagara Falls, N.Y.
[73] Assignee: Textron Inc., Providence, R.I.
[22] Filed: Feb. 24, 1970
[21] Appl. No.: 13,624

[52] U.S. Cl. .............................320/45, 320/35, 320/DIG. 1
[51] Int. Cl. .......................................................H02j 7/00
[58] Field of Search ...............324/94, 29.5; 320/39, 40, 45, 320/DIG. 1, 35, 36

[56] References Cited

UNITED STATES PATENTS

| | | | |
|---|---|---|---|
| 3,302,091 | 1/1967 | Henderson | 320/DIG. 1 |
| 3,321,690 | 5/1967 | McCarthy et al. | 320/DIG. 1 |
| 3,329,882 | 7/1967 | Sobel | 320/45 X |
| 3,343,083 | 9/1967 | Beusman | 324/94 |
| 3,348,118 | 10/1967 | Watrous | 320/DIG. 1 UX |
| 3,387,199 | 6/1968 | Billerbeck et al. | 320/35 X |
| 3,417,307 | 12/1968 | Kosa et al. | 320/DIG. 1 UX |
| 3,417,308 | 12/1968 | Mandel et al. | 320/DIG. 1 UX |
| 3,421,067 | 1/1969 | Wilson et al. | 324/94 X |
| 3,541,422 | 11/1970 | Paukovich et al. | 320/46 X |
| 3,564,382 | 2/1971 | King et al. | 324/94.5 |

FOREIGN PATENTS OR APPLICATIONS

| | | | |
|---|---|---|---|
| 818,034 | 7/1969 | Canada | 320/DIG. 1 UX |

*Primary Examiner*—J. D. Miller
*Assistant Examiner*—Robert J. Hickey
*Attorney*—Bean & Bean

[57] ABSTRACT

A rechargeable storage battery power supply system in which a coulometer is used as a logic device to provide transition between high charge rate and low charge rate. During battery discharge, the coulometer may act as a logic device to disconnect the load from the battery after a predetermined time integral of current is drawn from the battery. The charging current is applied in reverse direction through the coulometer and when the coulometer reaches its high impedance state in the charging direction a trickle charge is bypassed to the battery. The trickle charge control includes a thermistor responsive to battery temperature. An additional circuit is provided which acts to provide constant voltage float charge after the battery has been fully charged, and which additional circuit also uses the coulometer as a logic element.

10 Claims, 3 Drawing Figures

INVENTOR
CARL E. BIGGS

3,652,917

BATTERY CHARGING SYSTEM USING A COULOMETER AS A LOGIC DEVICE

BACKGROUND OF THE INVENTION

Heretofore, the control of change rate for storage cells has been accomplished in a number of different ways. With batteries of the sealed nickel-cadmium type, the usual methods used for lead-acid batteries are of little use. The safest and probably most efficient way to charge sealed nickel-cadmium batteries is to utilize the so-called trickle charge method but, as is well known, this method involves a considerable expenditure of time.

Due to the fact that sealed nickel-cadmium type batteries exhibit very little, if any, change in terminal voltage as a function of the level of the charge during the recharging cycle, it has been especially difficult to provide rapid recharging systems for this type of battery.

For vented nickel-cadmium batteries, the more usual methods of recharging are more applicable since the danger of case rupture, as is the case with sealed cadmium-nickel batteries, is not present. However, even with the vented cells, the danger of electrolyte loss due to overcharging and consequent damage to the cell is present.

BRIEF SUMMARY OF THE INVENTION

The present invention relates to a battery charging system for the charging of either vented or sealed nickel-cadmium batteries wherein a coulometer is provided to produce logic for effecting the transition between a rapid or high charging rate and a low or trickle charging rate and wherein the trickle charging rate mechanism includes a temperature-sensitive device for modifying the trickle charge rate so as to prevent possible rupture of the battery cells in the case of sealed batteries, and loss of electrolyte in the case of vented batteries. The coulometer may also be used as a logic device for a constant voltage float charge circuit which is operative after the battery becomes fully charged.

DETAILED DESCRIPTION OF THE INVENTION

Figure 1:
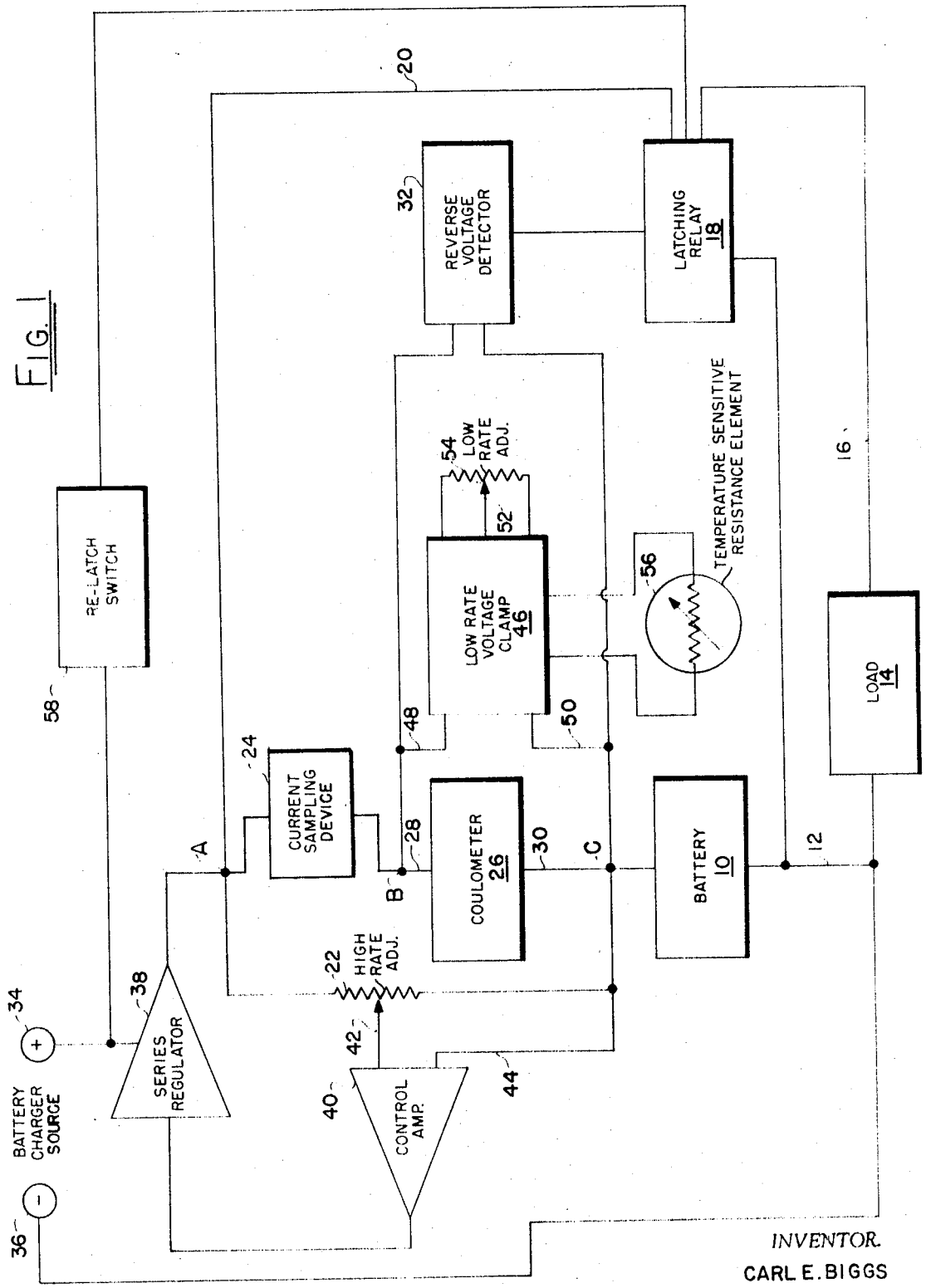
FIG. 1 is a block diagram illustrating the principles of the invention.

With reference to FIG. 1, the power supply system according to this invention will be seen to include the battery 10 normally connected by the conductor 12 to whatever load 14 it may be desired to service, the return path for the system normally being through the conductor 16, latching relay 18, conductor 20 and through the parallel paths between the junctions A and C. One of these paths is through the resistor 22 which is of relatively high value so that very little of the current drained from the battery 10 passes through, the purpose of this resistor being apparent presently.

The other path between the junctions A and C is through a current sampling device 24 which may be in the form of a resistor, a current transformer, a Hall effect device or the like, and the coulometer 26 in series, the impedance of the device 24 being very much less than that of the resistor 22. Thus, during such time as the state of the relay is such as to connect the battery 10 across the load 14, substantially all of the current drawn by the load passes in one direction through the coulometer 26.

The coulometer 26 is of conventional construction such as, for example, that described in U.S. Pat. No. 3,302,091, Jan. 31, 1967. Such a device is characterized by a pair of reversible electrodes 28 and 30 initially having substantially the same electrode potentials but exhibiting a substantial and abrupt change of voltage between its electrodes when more than a definite quantity of electricity has passed through the device.

Thus, with the battery 10 in fully charged condition and the condition of the coulometer 26 being such that its electrodes 28 and 30 exhibit substantially the same potential, it is connected to the load until such time as the coulometer passes a definite amount of current, at which time the voltage at junction C abruptly increases with respect to the voltage at junction B and the reverse voltage detector 32 actuates the relay 18 to disconnect the conductors 16 and 20 and thus isolate the battery from the load.

A charging current from a suitable source may be applied at the terminals 34 and 36 and is thereby applied to the battery 10 under control of the regulator 28 principally through the current sampling device 24 and the coulometer 26, although, as above noted, a minor amount of the charging current bypasses the coulometer through the resistor 22. The regulator passes the battery charging current under control of the amplifier 40 which is responsive to the position of the moveable tap 42 of the resistor 22.

Since the current is now reversed through the coulometer, it displays very little potential difference between its electrodes and this condition will prevail until the time integral of the charging current passing through the coulometer equals the time integral of the current which had passed through the coulometer during discharge, at which time the potential across the coulometer electrodes once again abruptly increases.

Since the battery is not 100 percent efficient and requires a continual charge current to overcome its self-discharge additional charging is required and this is achieved by the device 46 as indicated in FIG. 1. The device 46 controls charging current flow through conductors 48 and 50 in parallel with the coulometer and controls this current flow to a desired low value as obtained by adjustment of the moveable tap 52 of the voltage divider resistor 54. This trickle charge is further controlled by the thermistor 56 which senses the battery temperature.

As will be evident hereafter, the regulator 38 as controlled by the amplifier 40 is effective to maintain a constant voltage between the junctions A and C which passes a high charging current to the battery so long as the impedance of the coulometer is low. As soon as the impedance of the coulometer abruptly increases as aforesaid, the voltage across the junctions B and C rises so that the device 46 is no longer shorted out and the trickle charge is maintained and controlled principally by the device 46 and its associated components 54 and 56 since very little current is now required through the coulometer to maintain the voltage across its electrodes and consequently across the junctions B and C.

To complete the system, the re-latch switch 58 is provided to actuate the relay 18 and restore the discharge connections to the load. The re-latch switch may be actuated as desired, for example, it may be actuated by a timer or in conjunction with a redundant battery system when the latter reaches the state in which its reverse voltage detector actuates its latching relay.

Figure 2:
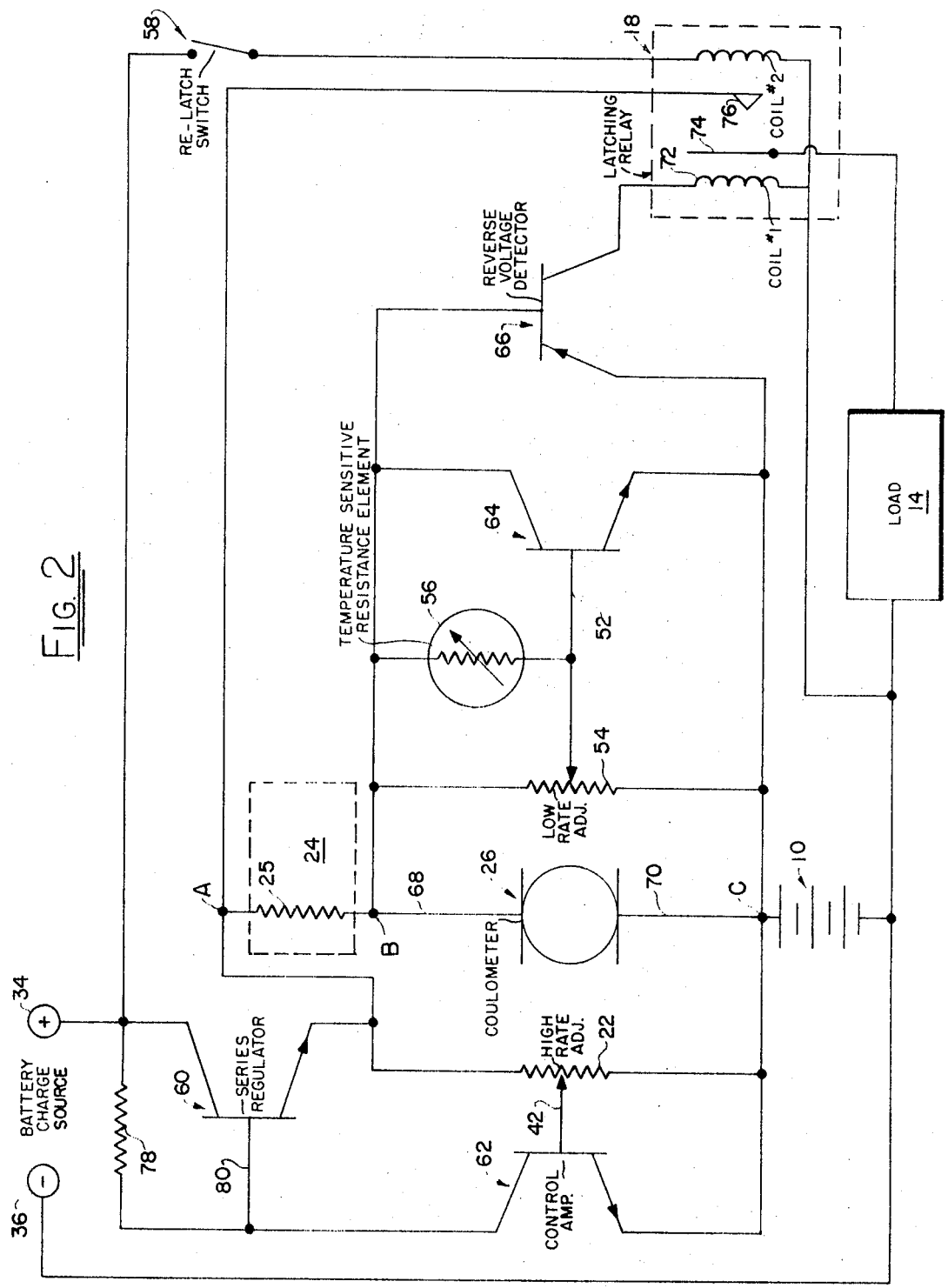
FIG. 2 is a circuit diagram illustrating an operative embodiment.

An operative embodiment of the invention is illustrated in FIG. 2 wherein it will be seen that the series regulator 38 of FIG. 1 comprises an NPN-transistor 60, the control amplifier 40 of FIG. 1 comprises an NPN-transistor 62, the low rate voltage clamp 46 of FIG. 1 comprises an NPN-transistor 64; the reverse voltage detector 32 of FIG. 1 comprises a PNP-transistor 66 and the current sampling device 24 comprises a resistor 25. The battery 10 may be a cadmium-nickel battery and the coulometer 26 is a cadmium-cadmium hydroxide coulometer whose initial condition is coordinated with that of the battery 10 such that when the battery 10 is fully charged, the electrodes 68 and 70 of the coulometer exhibit substantially no potential difference regarding of the amount of current being drawn from the battery through the load 14. This type of coulometer is essentially a two state device and after passing a predetermined quantity of current therethrough as drawn by the load 14, the voltage appearing at the electrode 68 will abruptly change to a value lower than that at the electrode 70. The reverse voltage detector 66 which was, until this time, shorted out by the coulometer 26, will now conduct to energize the coil 72 of the latching relay 18 so as to cause the moveable contact 74 thereof to move out of electrical contact with the stationary contact 76 and thus isolate the load 14 from the battery 10.

When the charging source is connected, the potential at the moveable tap 42 of the resistor 22 goes relatively positive and causes the transistor 62 to conduct. The emitter-collector path of the transistor 62 is connected through the resistor 78 to control the potential at the base electrode 80 of the transistor 60. The transistor 60 is therefore driven conductive and a relatively high charging current is permitted to pass to the battery 10. Since the direction of current through the coulometer 26 is now reversed, the electrode potentials will be substantially the same and the coulometer initially short circuits the low rate voltage clamp so that the transistor 64 is nonconductive.

The effect of the two transistors 60 and 62 is to maintain a constant voltage between the junctions A and C since there is virtually no voltage drop across the coulometer 26, the voltage at junction B is substantially the same as that at junction C until the coulometer 26 passes sufficient current in the charging direction to sense that the battery 10 is substantially fully charged at which time a voltage drop across the coulometer 26 will abruptly appear so that the voltage at junction B goes positive causing current to flow through the low rate adjustment voltage divider resistor 54 so that the voltage at the moveable tap 52 and consequently at the base of the transistor 64 goes positive, causing the latter to conduct.

It will be appreciated that the circuit described is characterized by the fact that the coulometer does not control the charge rate at any time, but acts, instead, to provide logic to the circuit to determine if the charger should be in the high rate or the low rate mode. The high rate charge is regulated at any desired rate by suitable adjustment of the moveable tap 42 and the low rate charge is controlled by adjustment of the movable tap 52, the thermistor 56 modifying the low charge rate according to the battery temperature. For this purpose, it will be understood that the thermistor 56 may be located in direct or indirect contact with the electrolyte in the battery 10.

Figure 3:
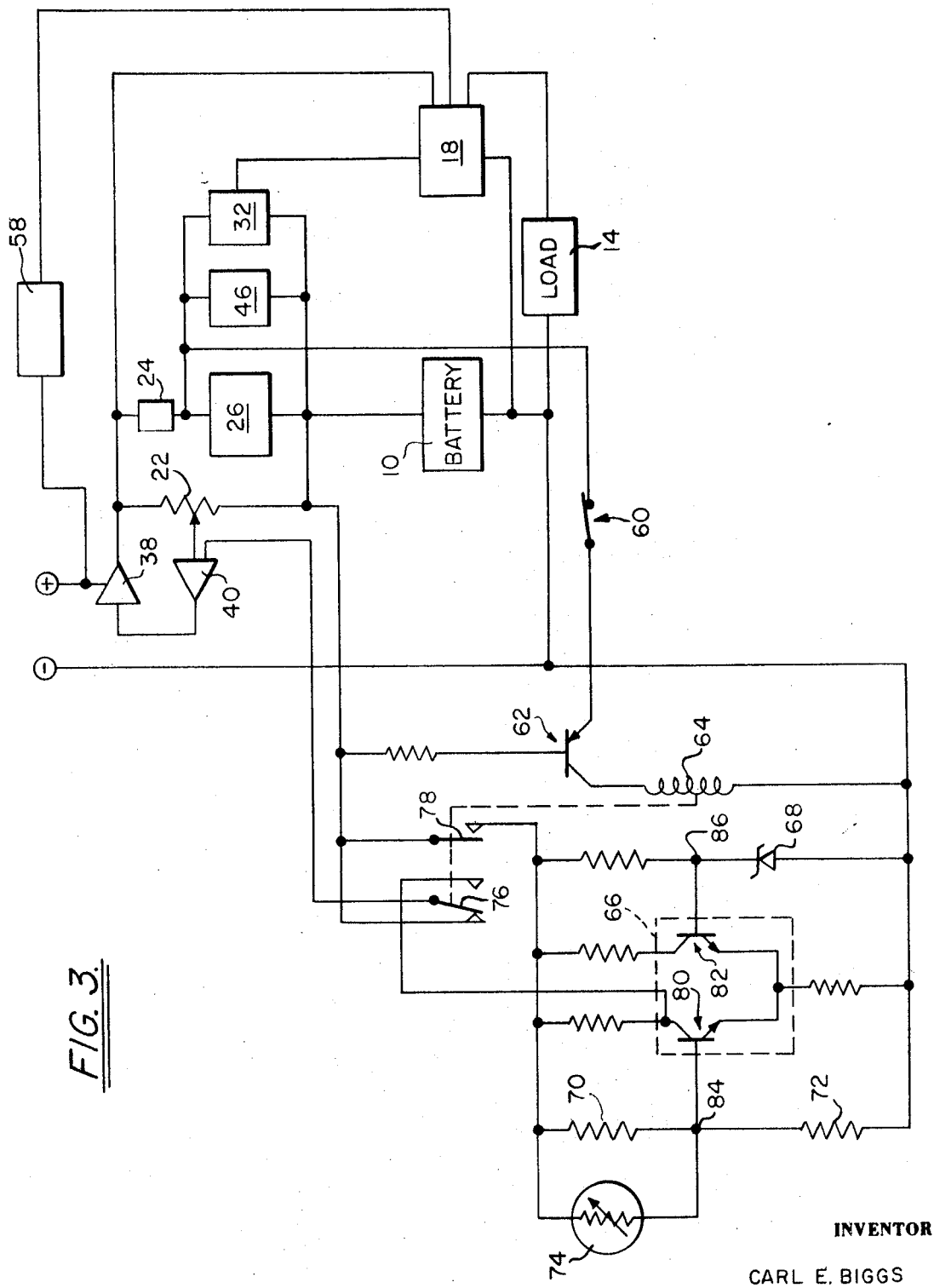
FIG. 3 is a circuit diagram illustrating the constant voltage float charge system.

The circuit shown in FIG. 3 represents an optimum system for charging vented nickel-cadmium batteries since it provides controlled constant current charge until the battery is fully charged and thereafter converts to constant voltage float charge to maintain the battery in fully charged condition. So much of the circuit as has been described in conjunction with FIGS. 1 and 2 is shown in simplified form in FIG. 3 and operates on the constant current high rate charging principle as described above until the battery 10 is fully charged and the voltage across the coulometer 26 rises. With the manual mode selection switch 60 closed, the rising voltage across the coulometer turns the relay control transistor 62 on, energizing the relay winding 64 thereby to apply power to the differential amplifier 66, voltage reference zener diode 68, voltage divider 70, 72 and the thermistor 74 through the relay switch moveable contacts 76 and 78. FIG. 3 illustrates the positions of the switch contacts prior to turning on of the transistor 62 and with the emitter of the control amplifier 40 still connected to the positive terminal of the battery 10.

When the transistor 62 is turned on and the relay switch contacts actuated, the emitter of the control amplifier 40 is connected to the output of the differential amplifier 66, which, as shown, may comprise the transistor pair 80, 82. The differential amplifier 66 compares the output of the voltage divider 70, 72 at position 84 with the reference voltage at junction 86. The thermistor 74 senses the battery temperature and, being in parallel with the voltage divider resistor 70, modifies the voltage at the junction 84 according to battery temperature. Since the output of the differential amplifier is connected to the control amplifier 40, the battery charging current will be controlled to maintain the battery voltage at a predetermined set point for the battery temperature.

The manual switch 60 is provided so that, when opened, the constant voltage float charge system is inactive and the system will operate only in the constant current mode as described in conjunction with FIGS. 1 and 2. Alternatively, in order to allow the high and low rate constant current charging mode to be effective while still retaining the constant voltage float charge system without requiring manual actuation of a switch such as switch 60, the switch 60 may be dispensed with or retained closed and the relay constructed to operate with time delay. In this fashion, high and low constant current charging will be followed, after time delay, with the constant voltage float charging operation.

What is claimed is:

1. A rechargeable storage battery power supply system comprising, in combination,
   a storage battery and a load through which said battery is adapted to discharge,
   a coulometer in series with said battery and the load,
   means for disconnecting said battery from said load in response to an abrupt electrode potential appearing across said coulometer indicating predetermined discharge of said battery,
   means for connecting a charging current to said battery through said coulometer, and
   means continuously connected in parallel across said coulometer for bypassing a trickle current charge therearound when an abrupt electrode potential appears across the coulometer indicating predetermined charging of the battery.

2. In a rechargeable storage battery power supply system including a battery adapted to discharge through a load, in combination,
   coulometer means for reverting to a state of high impedance to a battery charging current therethrough in response to predetermined charging of said battery,
   means for charging said battery through said coulometer means,
   current sampling means in series with said means for charging and said coulometer means, and
   a low charge rate voltage clamp connected in series with said current sampling means across said coulometer means when said coulometer means reverts to said high impedance state.

3. In the power supply system as defined in claim 2 wherein said low charge rate voltage clamp includes a thermistor sensitive to battery temperature to modify the low charge rate.

4. In the power supply system as defined in claim 3, including a charging current regulator connected to said current sampling means a high charge rate control resistor connected in parallel with said current sampling means and said coulometer means, and a control amplifier for said regulator connected to said high charge rate control resistor.

5. In the power supply system as defined in claim 2, including a charging current regulator connected to said current sampling means, a high charge rate control resistor connected in parallel with said current sampling means and said coulometer means, and a control amplifier for said regulator connected to said high charge rate control resistor.

6. A power supply system comprising, in combination,
   a storage battery,
   an electrical load,
   a charging current source for said battery,
   a coulometer which reversibly produces an abrupt transition from substantially zero potential to a finite potential thereacross in response to passage of a predetermined quantity of current therethrough,
   switch means for connecting said coulometer and said load in series across said battery,
   means connected across said coulometer for disabling said switch means in response to appearance of said finite potential across the coulometer when said battery is discharging,
   said charging current source and said coulometer being in series across said battery to recharge the battery, and means connected across said coulometer means for passing a limited charging current to said battery in response to appearance of said finite potential across the coulometer when the battery is being charge.

7. The power supply system as defined in claim 6, wherein the last means includes a thermistor associated with said battery to limit the charging current in accord with the temperature of the battery.

8. In a rechargeable storage battery power supply system including a battery adapted to discharge through a load, in combination, a coulometer which reversibly produces an abrupt transition from substantially zero potential to a finite potential thereacross in response to passage of a predetermined quantity of current therethrough, switch means for connecting said coulometer in series with a load across said battery, means for passing a controlled high charging rate current to said battery through said coulometer, and means for passing a limited charging current to said battery in response to appearance of said finite potential across the coulometer when the battery is being charged, said means for passing a high charging rate current including a control amplifier, said means for passing a limited charging current comprising a constant voltage float device and including a voltage reference and differential amplifier means for controlling said control amplifier to maintain a constant voltage float charge across said battery.

9. The power supply system as defined in claim 8 wherein the means for passing a limited charging current also includes a thermistor associated with said battery to limit the charging current in accord with the temperature of the battery.

10. The power supply system as defined in claim 8, wherein said means for passing a limited charging current further comprises a thermistor associated with said battery to limit the charging current in accord with the temperature of the battery.

* * * * *